US010565876B2

(12) United States Patent
Suzuki et al.

(10) Patent No.: US 10,565,876 B2
(45) Date of Patent: Feb. 18, 2020

(54) INFORMATION PROCESSING APPARATUS, ONBOARD DEVICE, INFORMATION PROCESSING SYSTEM, AND INFORMATION PROCESSING METHOD

(71) Applicants: KABUSHIKI KAISHA TOSHIBA, Minato-ku (JP); TOSHIBA INFRASTRUCTURE SYSTEMS & SOLUTIONS CORPORATION, Kawasaki-shi (JP)

(72) Inventors: Yoshihiko Suzuki, Suginami (JP); Yusuke Takahashi, Tama (JP); Toshio Sato, Yokohama (JP); Yoshikazu Ooba, Hachioji (JP); Hiroshi Sakai, Yokohama (JP); Hideki Ueno, Urayasu (JP)

(73) Assignees: KABUSHIKI KAISHA TOSHIBA, Minato-ku (JP); TOSHIBA INFRASTRUCTURE SYSTEMS & SOLUTIONS CORPORATION, Kawasaki-shi (JP)

( * ) Notice: Subject to any disclaimer, the term of this patent is extended or adjusted under 35 U.S.C. 154(b) by 0 days.

(21) Appl. No.: 16/253,765

(22) Filed: Jan. 22, 2019

(65) Prior Publication Data
US 2019/0236952 A1 Aug. 1, 2019

(30) Foreign Application Priority Data
Jan. 29, 2018 (JP) .................. 2018-013048

(51) Int. Cl.
*G08G 1/14* (2006.01)
*G07B 15/02* (2011.01)

(52) U.S. Cl.
CPC ............. *G08G 1/143* (2013.01); *G08G 1/145* (2013.01)

(58) Field of Classification Search
CPC ................................................. B62D 15/025
See application file for complete search history.

(56) References Cited

U.S. PATENT DOCUMENTS

| 6,061,625 A | 5/2000 | Fastenrath |
| 2002/0082767 A1* | 6/2002 | Mintz ............... H04W 4/40 |
| | | 701/117 |

(Continued)

FOREIGN PATENT DOCUMENTS

| JP | 3-252799 | 11/1991 |
| JP | 2000-504859 | 4/2000 |

(Continued)

*Primary Examiner* — Joseph H Feild
*Assistant Examiner* — Pameshanand Mahase
(74) *Attorney, Agent, or Firm* — Oblon, McClelland, Maier & Neustadt, L.L.P.

(57) ABSTRACT

According to one embodiment, in general, an information processing apparatus includes one or more processors. The one or more processors receive from an onboard device of a probe vehicle an image showing a vehicle group of one or more vehicles stopping on the same lane, imaging time of the image, and a position of the probe vehicle at the imaging time. The one or more processors select vehicle groups according to the imaging time and an imaging position. The one or more processors identify the selected vehicle groups as a vehicle queue. The one or more processors calculate a stopping vehicle-queue evaluation value. The one or more processors calculate a parking vehicle-queue evaluation value. The one or more processors determine whether the identified vehicle queue is the stopping vehicle queue or the parking vehicle queue.

8 Claims, 11 Drawing Sheets

(56) References Cited

U.S. PATENT DOCUMENTS

| | | | | |
|---|---|---|---|---|
| 2005/0125153 A1* | 6/2005 | Matsumoto | ......... | B60T 8/17557 701/300 |
| 2015/0049908 A1* | 2/2015 | Ogawa | ................... | G08G 1/166 382/103 |
| 2016/0253902 A1* | 9/2016 | Yokoi | .................. | G08G 1/0112 348/149 |
| 2018/0374345 A1 | 12/2018 | Suzuki et al. | | |

FOREIGN PATENT DOCUMENTS

| | | |
|---|---|---|
| JP | 2008-234183 | 10/2008 |
| JP | 2009-169527 | 7/2009 |
| JP | 2014-002477 | 1/2014 |
| JP | 2015-076074 | 4/2015 |
| JP | 2016-062443 | 4/2016 |
| JP | 2016-170708 | 9/2016 |
| JP | 2016-200931 | 12/2016 |
| JP | 2017-045211 | 3/2017 |
| JP | 2019-8433 A | 1/2019 |

* cited by examiner

FIG.9
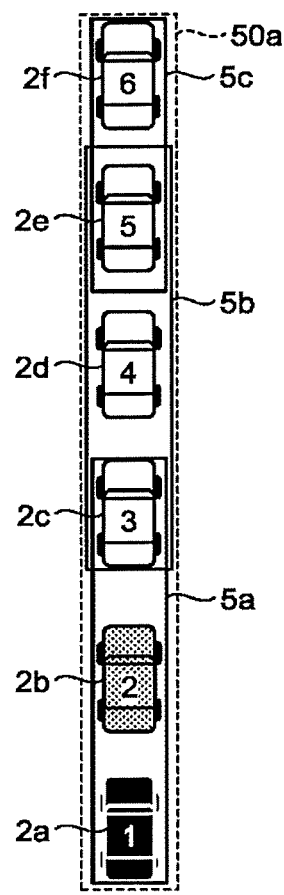

FIG.10

| CATE-GORY | CONDITION ID | CONDITION | POINT |
|---|---|---|---|
| | 1 | VEHICLE QUEUE IS LOCATED NEAR CENTER OF LANE. | 3 |
| | 2 | MOTION OF STOPPING VEHICLE QUEUE IS DETECTED. | 10 |
| STOPPING VEHICLE QUEUE | 3 | DISTANCE FROM FOREFRONT OF VEHICLE QUEUE TO TRAFFIC LIGHT OR RAILROAD CROSSING AHEAD OF VEHICLE QUEUE IS THRESHOLD OR LESS. | 5 |
| | 4 | DISTANCE FROM FOREFRONT OF VEHICLE QUEUE 50 TO PARKING METER IS LONGER THAN THRESHOLD. | 3 |
| | 5 | DISTANCE FROM FOREFRONT OF VEHICLE QUEUE 50 TO BUS STOP IS THRESHOLD OR LESS. | 5 |
| | 6 | PROPORTION OF VEHICLE QUEUES HAVING SAME FOREFRONT OR END POSITION AS CURRENTLY DETECTED VEHICLE QUEUE WERE STOPPING VEHICLE QUEUES IN PREVIOUSLY DETECTED VEHICLE QUEUES IS THRESHOLD OR MORE. | 3 |
| | 101 | VEHICLE QUEUE IS LOCATED CLOSER TO ROAD SHOULDER THAN TO CENTER OF LANE. | 3 |
| | 102 | DISTANCES FROM FOREFRONT OF VEHICLE QUEUE 50 TO TRAFFIC LIGHT AND RAILROAD CROSSING ARE LONGER THAN THRESHOLD. | 3 |
| PARKING VEHICLE QUEUE | 103 | DISTANCE FROM FOREFRONT OF VEHICLE QUEUE 50 TO PARKING METER IS THRESHOLD OR LESS. | 5 |
| | 104 | DISTANCE FROM FOREFRONT OF VEHICLE QUEUE 50 TO BUS STOP IS LONGER THAN THRESHOLD. | 3 |
| | 105 | PROPORTION OF VEHICLE QUEUES HAVING SAME FOREFRONT OR END POSITION AS CURRENTLY DETECTED VEHICLE QUEUE WERE PARKING VEHICLE QUEUES IN PREVIOUSLY DETECTED VEHICLE QUEUES IS THRESHOLD OR MORE. | 3 |
| | 106 | ANOTHER PROBE VEHICLE HAS DETECTED VEHICLE QUEUE HAVING SAME FOREFRONT OR END POSITION AS DETECTED VEHICLE QUEUE AND INCLUDING VEHICLES WITH SIMILAR ATTRIBUTION INFORMATION. | 7 |

INFORMATION PROCESSING APPARATUS, ONBOARD DEVICE, INFORMATION PROCESSING SYSTEM, AND INFORMATION PROCESSING METHOD

CROSS-REFERENCE TO RELATED APPLICATIONS

This application is based upon and claims the benefit of priority from Japanese Patent Application No. 2018-013048, filed Jan. 29, 2019, the entire contents of which are incorporated herein by reference.

FIELD

Embodiments described herein relate generally to an information processing apparatus, an onboard device, an information processing system, and an information processing method.

BACKGROUND

Conventionally, acquiring and analyzing information from a probe vehicle in order to understand traffic conditions such as road congestion or to find on-street parking is known. By such a technique, stopping vehicles are detected on the road from an image of the surroundings generated by an imaging device mounted on the probe vehicle, for example.

In view of traffic information management, it is useful to determine whether a detected vehicle has stopped for a certain period or longer or is temporarily stopping, waiting for a traffic light.

Conventionally, there have been demands reducing processing load for determining the status of stopping vehicles, i.e., whether the vehicle has stopped for a certain period or longer or is temporarily stopping on the road.

BRIEF DESCRIPTION OF THE DRAWINGS

FIG. 9 is a diagram of an exemplary vehicle queue identified by the information processing apparatus according to the embodiment;

FIG. 10 is a diagram of exemplary conditions according to the embodiment;

DETAILED DESCRIPTION

According to one embodiment, in general, an information processing apparatus includes one or more processors. The one or more processors receive from an onboard device f a probe vehicle, en image, imaging time, and a position of the probe vehicle at the imaging time, the image showing a vehicle group including one or more vehicles at a stop on the same lane, the imaging time at which the image is generated. The one or more processors select a plurality of vehicle groups in accordance with the imaging time and the position of the probe vehicle at the imaging time. The one or more processors identify the selected vehicle groups as a vehicle queue. The one or more processors calculate a stopping vehicle-queue evaluation value on the basis of a plurality of stopping vehicle-queue conditions, the stopping vehicle-queue evaluation value that indicates a level of possibility of the identified vehicle queue being a topping vehicle queue that has stopped for a period less than a threshold, the stopping vehicle-queue conditions that define characteristics of the stopping vehicle queue. The one or more processors calculate a parking vehicle-queue evaluation value on the basis of a plurality of parking vehicle-queue conditions, the parking vehicle-queue evaluation value that indicates a level of possibility of the identified vehicle queue being a parking vehicle queue that has stopped for a period not less than the threshold, the parking vehicle-queue conditions that define characteristics of the parking vehicle queue. The one or more processors determine whether the identified vehicle queue is the stopping vehicle queue or the parking vehicle queue, according to the stopping vehicle-queue evaluation value and the parking vehicle-queue evaluation value.

Figure 1:
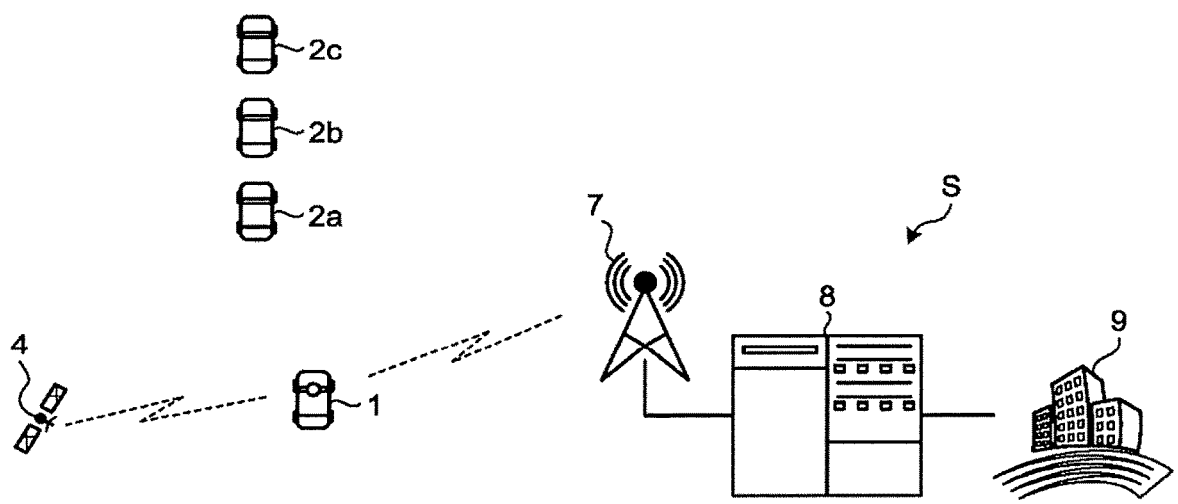
FIG. 1 is a diagram of an exemplary overall configuration of an information processing system according to an embodiment.

FIG. 1 is a diagram of an exemplary overall configuration of an information processing system S according to the present embodiment. As illustrated in FIG. 1, the information processing system S includes a probe vehicle 1 and an information processing apparatus B.

The probe vehicle 1 incorporates an imaging device, a GPS antenna and transmits images and location information thereof to the information processing apparatus 8, while traveling on the road. The imaging device of the probe vehicle images vehicles 2a to 2c located on the adjacent lane, for example. The vehicles 2a to 2c are referred to as the vehicles 2 unless they need to be discriminated from each other. Although FIG. 1 shows one probe vehicle 1 alone, the information processing system S includes a plurality of probe vehicles 1.

The information processing apparatus 8 identifies a vehicle queue being at a stop on the road from the image and the location of the probe vehicle 1 received from the probe vehicle 1 to determine whether the vehicle queue is stopping or parking. The information processing apparatus 8 transmits a result of the determination on the vehicle queue, i.e., stopping or parking, and data on the location of the vehicle queue to a traffic information provider 9.

In the present embodiment the vehicle queue refers to a plurality of consecutive vehicles 2 located on the same lane. The inter-vehicle distance between the vehicles 2 in the queue is defined as two times the length of a standard vehicle 2 or less, for example. The inter-vehicle distance between the vehicles 2 in the queue is not limited to this example.

Parking vehicle queue refers to a vehicle queue stopping for a period equal to or above a threshold. Stopping vehicle queue refers to a vehicle queue stopping for a period less than the threshold. The stopping vehicle queue includes a vehicle queue temporarily stopping, waiting for a traffic light or because of traffic congestion, for example. In the present embodiment the threshold for the stopping time is set to 5 minutes, for example, but is not limited thereto. The stopping vehicle queue may be referred to as a temporarily stopping vehicle queue, a vehicle queue waiting for a traffic light, a vehicle queue in traffic congestion.

The probe vehicle 1 and the information processing apparatus 8 wirelessly transmit and receive information via a base station 7. Information communication means is not limited to this example. A global positioning system (GPS) satellite 4 transmits GPS radio waves to the probe vehicle 1.

The traffic information provider 9 receives information from the information processing apparatus 8 and provides drivers and business enterprises with traffic information based on the received information.

Figure 2:
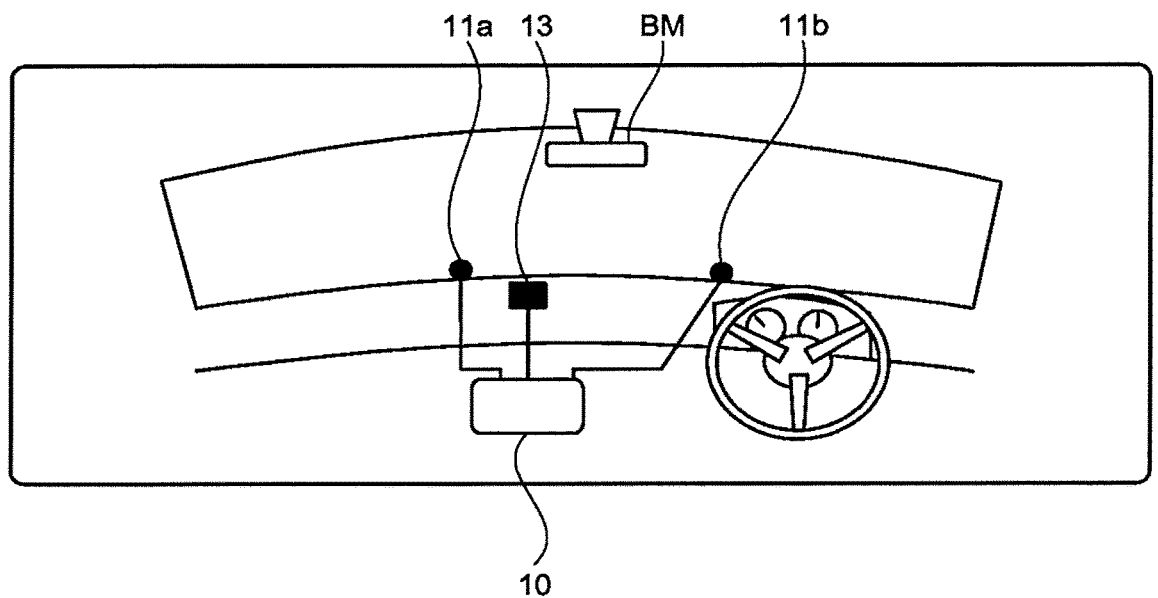
FIG. 2 is a diagram of an exemplary configuration of a probe vehicle around a cockpit (a driver's seat) according to the embodiment.

FIG. 2 is a diagram of an exemplary configuration of the probe vehicle 1 around a cockpit (a driver's seat according to the present embodiment. The probe vehicle 1 includes a controller 10, imaging devices 11a and 11b, a rearview mirror BM, and a GPS antenna 13. The GPS antenna 13 receives GPS signals from the GPS satellite 4.

The controller 10 controls the entire probe vehicle 1. The controller 10 is an exemplary onboard device in the present embodiment.

The imaging devices 11a and 11b constitute a stereo camera and image the vehicles 2a to 2c located ahead of the probe vehicle 1 at different angles. In the following, the imaging devices 11a and 11b are collectively referred to as the imaging devices 11 unless they need to be discriminated from each other. In the present embodiment the angle of view (imaging range) of the imaging devices 11 is set to cover about three vehicles located on the adjacent lane but is not limited thereto. Also, the imaging devices 11 generate moving images but may generate still images. The number and location of installation of the imaging devices 11 are not limited to the ones illustrated in FIG. 2. The imaging devices 11 may be a monocular camera or a camera that can image a 360-degree range.

Figure 3:
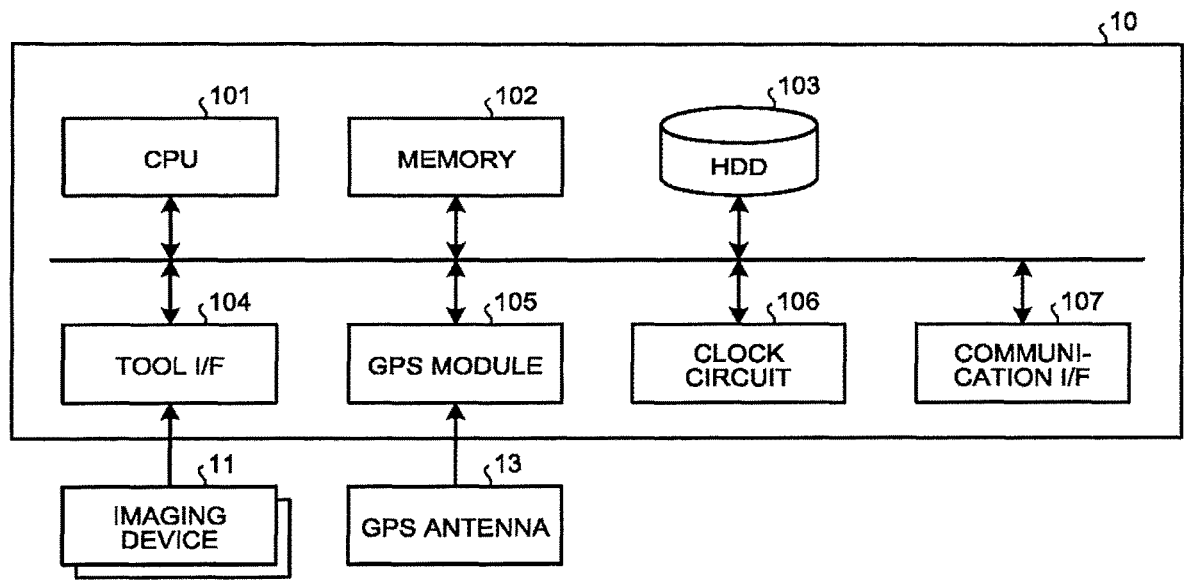
FIG. 3 is a diagram of an exemplary hardware configuration of a controller of the probe vehicle according to the embodiment.

FIG. 3 is a diagram of an exemplary hardware configuration of the controller 10 of the probe vehicle according to the present embodiment. The controller 10 includes a central processing unit (CPU) 101, a memory 102, a hard disk drive (HUD) 103, a tool interface (I/F) 104, a GPS module 105, a clock circuit 106, and a communication interface (I/F) 107. The controller 10 may include a storage medium such as a flash memory in place of the HDD 103.

The tool interface 104 is an interface for connecting to various kinds of tools of the probe vehicle 1. The tools include the imaging devices 11, an engine control unit (ECU), various kinds of sensors such as a vehicle wheel-speed sensor, a car navigation system, and a smartphone.

The GPS module 105 calculates a current position (latitude and longitude) of the probe vehicle 1 based on GPS radio waves received from a plurality of satellites 4 via the GPS antenna 13. The clock circuit 106 is a circuit having a clock function. The clock circuit 106 is a real time clock (RTC), for example, but is not limited thereto.

The communication I/F 107 is an interface for transmitting and receiving information via a network. The communication I/F 107 is connected to the base station 7 via a wireless network to transmit and receive information to and from the information processing apparatus 8, for example.

Figure 4:
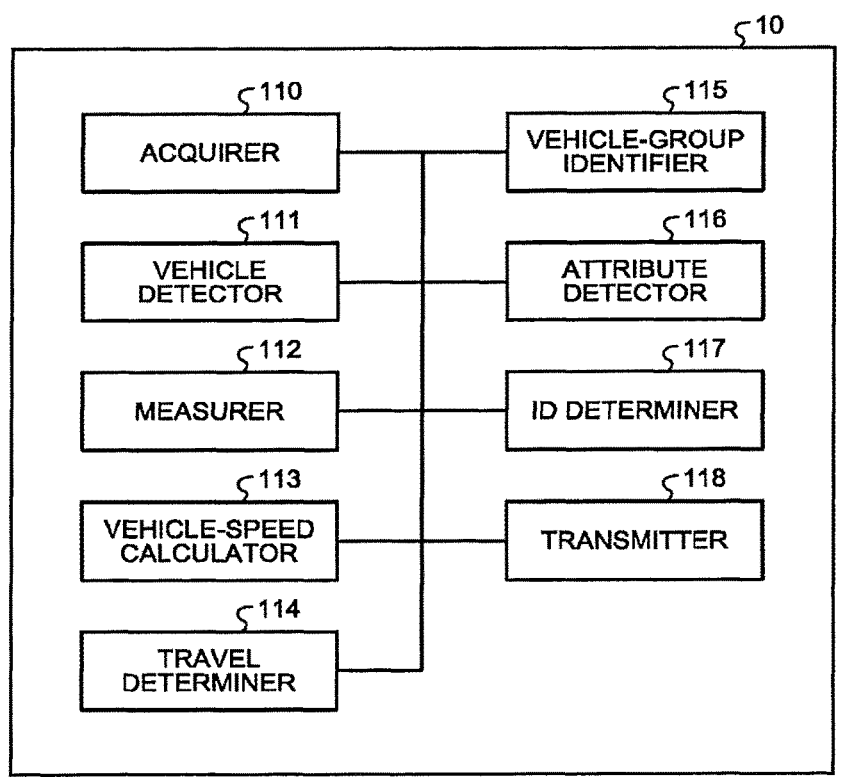
FIG. 4 is a block diagram of exemplary functions of the controller of the probe vehicle according to the embodiment.

FIG. 4 is a block diagram of exemplary functions of the controller 10 of the probe vehicle 1 according to the present embodiment. As illustrated in FIG. 4, the controller 10 includes an acquirer 110, a vehicle detector 111, a measurer 112, a vehicle-speed calculator 113, a travel determiner 114, a vehicle-group identifier 115, an attribute detector 116, an ID determiner 117, and a transmitter 118.

The acquirer 110 acquires various kinds of information via the tool interface 104. Specifically, the acquirer 110 acquires images generated by the imaging devices 11 at regular time intervals via the tool interface 104. The acquirer 110 of the present embodiment acquires a moving image including a plurality of frames at once but may acquire a still image including one frame at once.

When acquiring the image, the acquirer 110 acquires, as imaging time, current time at which the image is generated from the clock circuit 106. The acquirer 110 further acquires the position (latitude and longitude) of the probe vehicle at the imaging time of the image as an imaging position from the GPS module 105.

The vehicle detector 111 detects the vehicles 2a to 2c from the image acquired by the acquirer 110. Specifically, the vehicle detector 111 detects the vehicles 2a to 2c from the frames of the image through image processing such as pattern recognition on the frames. The vehicle detection method is not limited to this example.

The measurer 112 measures the inter-vehicle distance (lengthwise distance) between the probe vehicle 1 and each of the vehicles 2a to 2c, the inter-vehicle distances among the vehicles 2a to 2c, and the lateral distances between the probe vehicle 1 and the vehicles 2a to 2c in each frame of the image. In the present embodiment, the lateral distances among the vehicles 2a to 2c are defined as a distance between the centers of the widths of two of the vehicles 2. Alternatively, the lateral distance between two of the vehicles 2 may be set to the distance of a right or left-side space between the two vehicles 2.

The measurer 112 measures the inter-vehicle distances and the lateral distances from stereographic parallax of the imaging devices 11a and 11b, for example, however, it may use other known methods. The measurer 112 may generate a depth map based on stereographic parallax and correct the inter-vehicle distances and the lateral distances, referring to the depth map. The measurer 112 measures the length and width of a vehicle group identified by the vehicle-group identifier 115 described below and the lateral distance between the probe vehicle 1 and the vehicle group.

The vehicle-speed calculator 113 calculates a speed of the vehicle 2a closest to the probe vehicle 1 among the vehicles 2a to 2c appearing in the image. Specifically, the vehicle-speed calculator 113 calculates a relative speed of the vehicle 2a from a change in the inter-vehicle distance between the probe vehicle 1 and the vehicle 2a within a certain period and calculates the speed of the vehicle 2a from the relative speed of the vehicle 2a and the speed of the probe vehicle 1.

The travel determiner 114 determines that the vehicle 2a is at a stop or not traveling when the speed of the vehicle 2a is 0 km/hour. The travel determiner 114 may determine that the vehicle 2a is not traveling when the vehicle speed is less than a threshold.

The vehicle-group identifier 115 determines that the vehicles 2b and 2c ahead of the vehicle 2a on the same lane in the image are also stopping, when the travel determiner 114 determines that the vehicle 2a closest to the probe vehicle 1 is stopping. In this case, the vehicle-group identifier 115 identifies the vehicle 2a and the vehicles 2b and 2c as a vehicle group. The vehicles 2b and 2c are examples of other vehicles in the present embodiment.

The vehicle group includes one or more vehicles that are located in the imaging range of one imaging by the imaging devices 11 and at a stop on the same lane. The vehicle-group identifier 115 determines that the vehicles 2b and 2c are present on the same lane as the vehicle 2a when the lateral distance between the vehicle and each of the vehicles 2b and 2c is a threshold or less. The number of the vehicles 2 of the vehicle group is not limited to three.

The vehicle-group identifier 115 determines a vehicle group ID of the identified vehicle group. The vehicle-group identifier 115 counts the number of the vehicles 2 of the identified vehicle group. The vehicle group is also referred to as a vehicle queue let.

When the travel determiner 114 determines that one of the vehicles 2a to 2c, not hidden by the other vehicles and the entire vehicle body of which is shown in the image, is stopping, the vehicle-group identifier 115 may determine that the other vehicles 2 are also stopping.

The attribute detector 116 detects colors and heights of the vehicles 2 of the vehicle group as attribute information of the vehicles 2.

The ID determiner 117 sets a vehicle ID (identification information) of each of the vehicles 2 that enables identification of each of the vehicles 2 detected by the vehicle detector 111. The vehicle IDs are numbers such as 1 and 2, for example, but is not limited thereto, and may be alphabets. The ID determiner 117 of the present embodiment determines consecutive numbers or alphabets as the vehicle IDs of the vehicles 2 consecutively detected by the vehicle detector 111. The ID determiner 117 uniquely determines the vehicle ID for each vehicle 2 in at least one image. When determining that the vehicles 2 detected from different images are the same vehicle 2 by known image processing or according to the imaging time and the imaging position, the ID determiner 117 assigns the same vehicle ID to the vehicles 2. The ID determiner 117 is an exemplary identification information determiner in the present embodiment.

The transmitter 119 associates, for each vehicle group 5, the image, the imaging position, the imaging time, the vehicle group ID, the vehicle IDs of the vehicles 2 of the vehicle group, the various distances measured by the measurer 112, the attribute information (color and height) of the vehicles 2 of the vehicle group, IDs of the imaging devices 11, and an ID of the probe vehicle 1 with one another, to transmit such information to the information processing apparatus 8. The information transmitted by the transmitter 118 is not limited to these examples.

The following describes the details of the information processing apparatus 8. The information processing apparatus 8 represents a server or a personal computer (PC) and has a hardware configuration of a general computer including a CPU, a memory, an HDD, and a communication interface (I/F).

Figure 5:
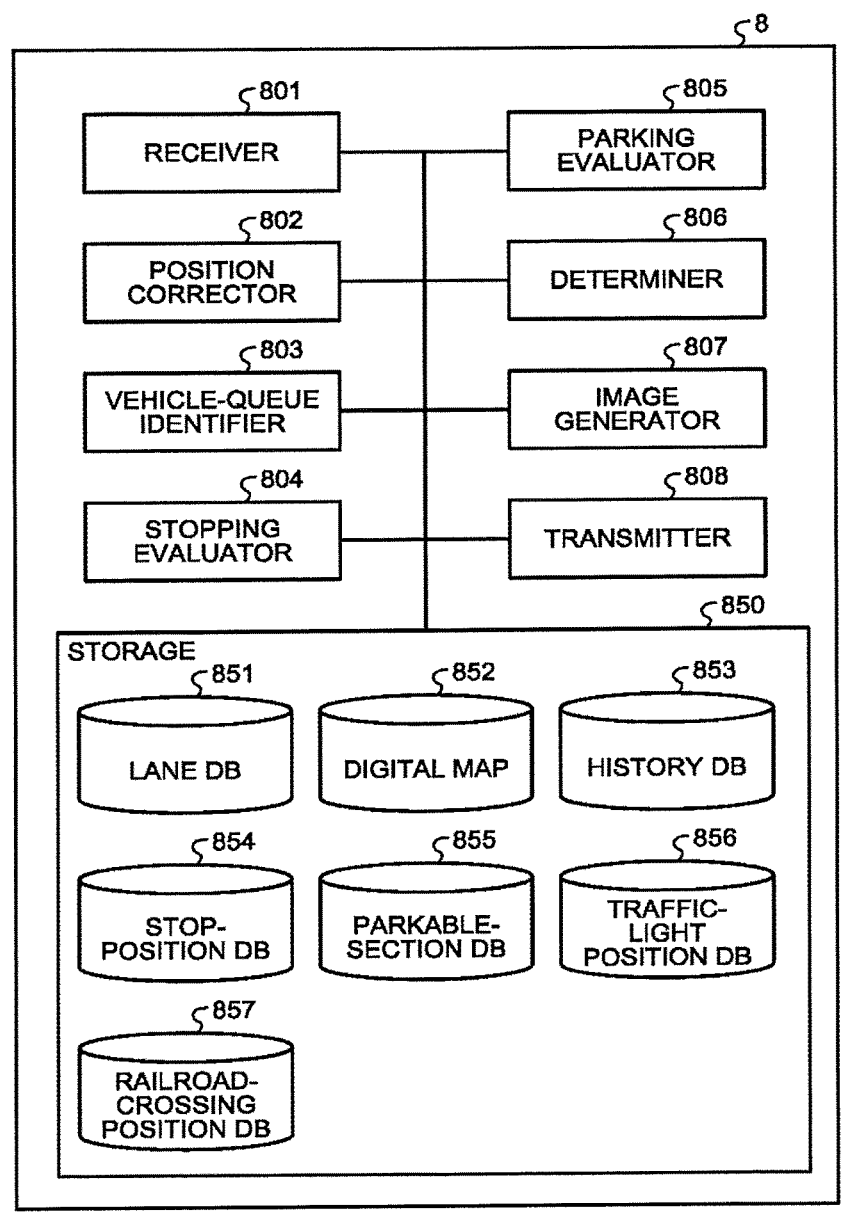
FIG. 5 is a block diagram of exemplary functions of an information processing apparatus according to the embodiment.

FIG. 5 is a block diagram of exemplary functions of the information processing apparatus 8 according to the present embodiment. As illustrated in FIG. 5, the information processing apparatus 8 includes a receiver 801, a position corrector 802, a vehicle-queue identifier 903, a stopping evaluator 804, a parking evaluator 305, a determiner 806, an image generator 807, a transmitter 808, and a storage 850.

The storage 850 stores therein a lane database (CB) 851, a digital map 852, a history database (DB) 853, a stop-position database (DB) 854, a parkable-section database (DR) 855, a traffic-light position database (DB) 856, and a railroad-crossing position database (DB) 957. The storage 850 is an HDD, for example.

The lane database 851 is a database of registered position (latitudes and longitudes) information of lanes on roads. The digital map 852 represents map information in the form of digital data.

The history database 853 is a database that stores therein previous results of the determination by the determiner 806 as a history, as described below.

The stop-position database 854 is a database of registered positions (latitudes and longitudes) of bus stops. The parkable-section database 855 is a database of registered parkable locations in roads such as locations of parking meters. The traffic-light position database 856 is a database of registered positions (latitudes and longitudes) of traffic lights. The railroad-crossing position database 857 is a database of registered positions (latitudes and longitudes) of railroad crossings.

The receiver 801 receives, from the controller 10, the image, the imaging position, the imaging time, the vehicle group ID, the vehicle IDs of the vehicles 2 of the vehicle group, the various distances measured by the measurer 112, the attribute information of the vehicles 2 of the vehicle group, the IDs of the imaging devices 11, and the ID of the probe vehicle 1.

The position corrector 802 corrects the imaging position (the position of the probe vehicle 1 at the time of generation of the image) received by the receiver 801 to position on each lane of a road, referring to the lane database 851 and the digital map 852. The position corrector 802 identifies positions (latitudes and longitudes) of the forefront and the rear end of the vehicle group according to the corrected imaging position, the inter-vehicle distances and the lateral distances among the probe vehicle 1 and the vehicles 2, and the length and width of the vehicle group.

The vehicle-queue identifier 803 selects a plurality of vehicle groups on the basis of the imaging time, the corrected imaging position, the attribute information of the vehicles 2 of the vehicle group, and the vehicle IDs of the vehicles 2 of the vehicle group, and identifies the selected vehicle groups as one vehicle queue. The details of the vehicle-queue identification method will be described later.

The stopping evaluator 804 calculates stopping vehicle-queue evaluation values on the basis of stopping vehicle-queue conditions. The topping vehicle-queue conditions define the characteristics of the stopping vehicle queue. The stopping vehicle-queue conditions are also referred to as conditions for determining the vehicle queue as a stopping vehicle queue. The stopping vehicle-queue evaluation values indicate the level of possibility of the vehicle queue identified by the vehicle queue identifier 803 being the stopping vehicle queue. The stopping vehicle-queue evaluation value is also referred to as likeliness of a stopping vehicle queue.

The parking evaluator 805 calculates parking vehicle-queue evaluation values based on parking vehicle-queue conditions. The parking vehicle-queue conditions define the characteristics of the parking vehicle queue. The parking vehicle-queue conditions are also referred to as conditions for determining the vehicle queue as a parking vehicle queue. The parking vehicle-queue evaluation values indicate the level of possibility of the vehicle queue identified by the vehicle-queue identifier 803 being a parking vehicle queue. The parking vehicle-queue evaluation values are also referred to as likeliness of a parking vehicle queue. In the following, the stopping vehicle-queue conditions and the parking vehicle-queue conditions are referred to simply as the conditions unless they need to be discriminated from each other. The details of the conditions will be described later.

The determiner 806 determines whether the identified vehicle queue is a stopping vehicle queue, a parking vehicle queue, or an unidentifiable vehicle queue as stopping or parking, from the stopping vehicle-queue evaluation value and the parking vehicle-queue evaluation value.

The image generator 807 generates a display image that shows the position of the vehicle group or the vehicle queue on a map. Specifically, the image generator 807 maps the positions of the vehicle groups on a map and generates an image that shows an overlapping area of the positions of the vehicle groups in a highlighted manner, as the display image.

The transmitter 808 transmits a result of the determination on the vehicle queue by the determiner 806 data such as the image to the traffic information provider 9. The transmitter 808 transmits the display image generated by the image generator 807 to the traffic information provider 9.

The following describes a flow of processing in the present embodiment.

Figure 6:
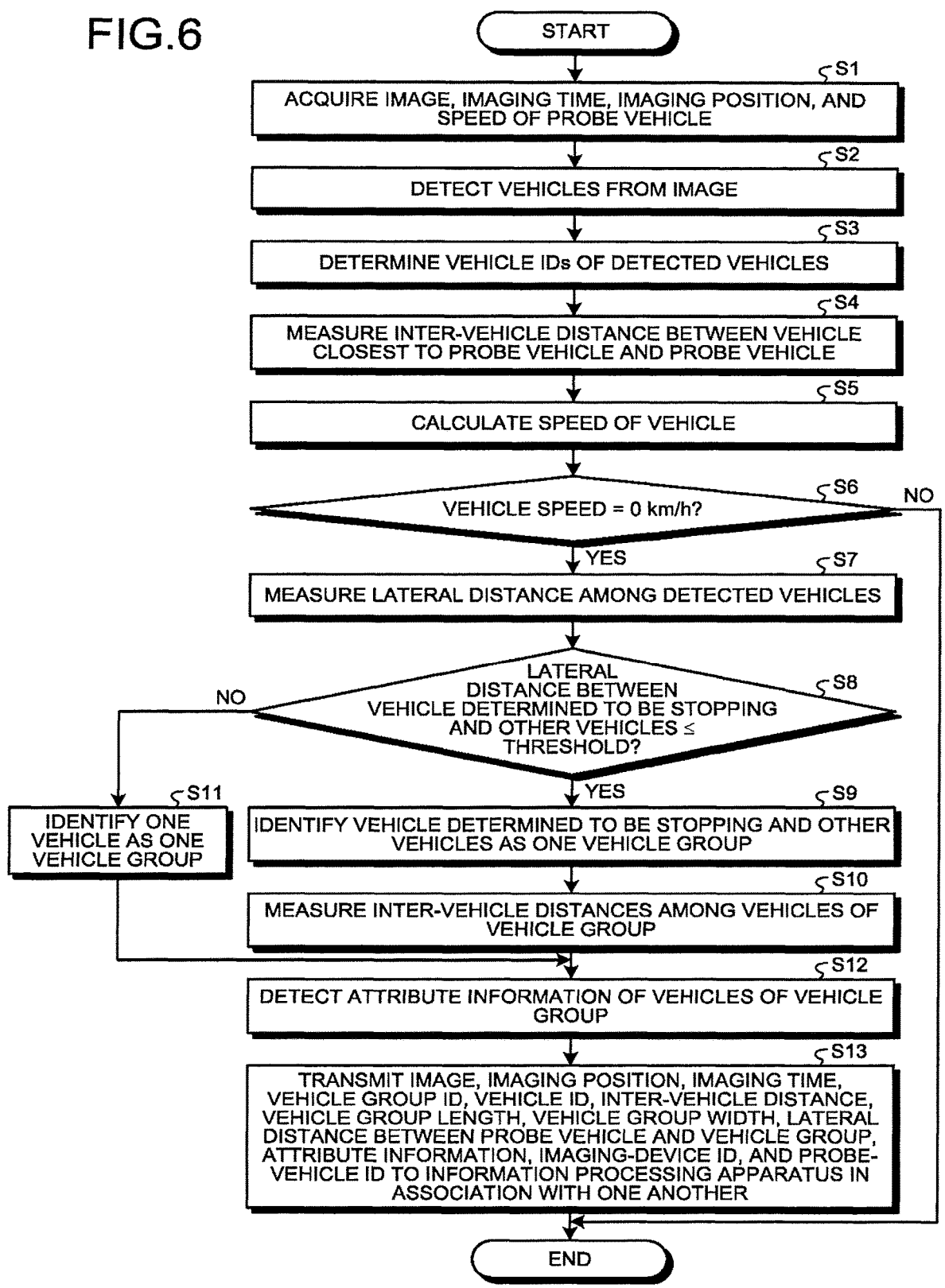
FIG. 6 is a flowchart of exemplary vehicle group detection processing executed by the controller according to the embodiment.

FIG. 6 is a flowchart of exemplary vehicle-group detection processing executed by the controller 10 according to the embodiment. The controller 10 executes the processing in the flowchart at regular time intervals while the probe vehicle 1 is traveling.

First, the acquirer 110 acquires an image from the imaging devices 11. The acquirer 110 acquires current time from the clock circuit 106 as imaging time. The acquirer 110 acquires the position of the probe vehicle 1 at the imaging time from the GPS module 105 as an imaging position. The acquirer 110 acquires a current speed of the probe vehicle 1 from the ECU (S1). The acquirer 110 may calculate the speed of the probe vehicle 1 from a wheel speed acquired from a wheel speed sensor or a change in the position of the probe vehicle 1 based on GPS radio waves.

Next, the vehicle detector 111 detects the vehicles m the acquired image (S2).

Figure 7:
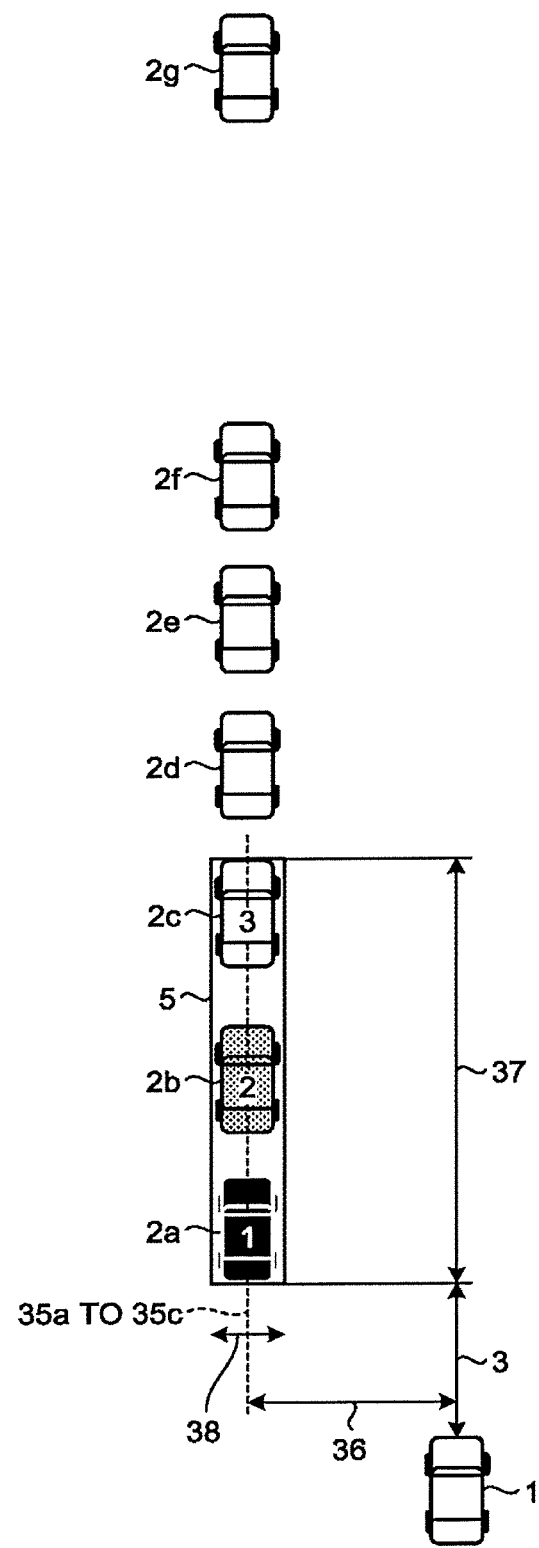
FIG. 7 is a diagram of exemplary vehicles detected by the controller according to the embodiment.

FIG. 7 illustrate the vehicles 2 detected by the controller 10 according to the present embodiment, by way of example. When the probe vehicle 1 is located at the position illustrated in FIG. 7, the image generated by the imaging devices 11 includes the vehicles 2a to 2c on the adjacent lane on the left side of the probe vehicle 1. In this case, the vehicle detector 111 detects the vehicles 2a to 2c from the image.

Next, the ID determiner 117 determines the vehicle IDs of the detected vehicles 2a to 2c. The ID determiner 117 determines the vehicle IDs of the vehicles 2a to 2c to be "1", "2", and "3", respectively, for example.

Next, the measurer 112 measures an inter-vehicle distance 3 between the probe vehicle 1 and the vehicle 2a closest to the probe vehicle 1 among the vehicles 2a to 2c appearing on the image (S4). The vehicle-speed calculator 113 calculates the relative speed of the vehicle 2a from change in the inter-vehicle distance 3 within a certain period, and calculates the speed of the vehicle 2a from the relative speed of the vehicle 2a and the speed of the probe vehicle 1 (S5).

The travel determiner 114 determines whether the speed of the vehicle 2a is 0 km/h (S6). If the speed of the vehicle 2a is not 0 km/h (No at S6), the travel determiner 114 determines that the vehicle 2a is travelling. This completes the processing.

If the speed of the vehicle 2a is 0 km/h (YES at S6), the travel determiner 114 determines that the vehicle 2a is at a stop. In this case, the measurer 112 measures the lateral distance of the vehicles 2a to 2c detected from the image (S7). In the example of FIG. 7, longitudinal (fore-and-aft) centers 35a to 35c of the vehicles 2a to 2c substantially match one another, therefore, the lateral distance of the vehicles 2a to 2c is zero meter.

Next, the vehicle-group identifier 115 determines whether the lateral distance between the vehicle 2a determined to be stopping and each of the vehicles 2b and is a threshold or less (S8). If the lateral distances between the vehicle 2a and the vehicles 2b and 2c are the threshold or less (YES at S8), the vehicle-group identifier 115 determines that the vehicles 2b and 2c are located on the same lane as the vehicle 2a. In this case, the vehicle-group identifier 115 identifies the vehicle 2a determined to be stopping and the other vehicles 2b and 2c as one vehicle group 5 (S9). The vehicle-group identifier 115 sets the vehicle group ID for the identified vehicle group.

Vehicles 2d to 2g in FIG. 7 do not appear on the image when the probe vehicle 1 is located at the position illustrated in FIG. 7, but they appear thereon along with the travel of the probe vehicle 1. The vehicle-group identifier 115 thus identifies a different vehicle group 5 including different vehicles along with the movement of the probe vehicle 1.

Next, the measurer 112 measures the inter-vehicle distances among the vehicles 2a to 2c of the identified vehicle group 5 (S10). The measurer 112 also measures the inter-vehicle distance between the probe vehicle 1 and each of the vehicles 2b and 2c. The measurer 112 measures the distance between the forefront of the vehicle 2c at the head of the vehicle group 5 and the rear end of the vehicle 2a at the end of the vehicle group 5 as a vehicle group length 37. The measurer 112 measures the width of the vehicle 2a at the end of the vehicle group 5 as a vehicle group width 36 and measures the distance the center of the width of the vehicle 2a at the end of the vehicle group 5 to the probe vehicle 1 as a lateral distance 36 between the probe vehicle 1 and the vehicle group 5.

If the lateral distance between the vehicle 2a and each of the vehicles 2b and 2c is longer than the threshold (NO at S6), the vehicle-group identifier 115 determines that the vehicles 2b and 2c are not located on the same lane as the vehicle 2a. In this case, the vehicle-group identifier 115 identifies the vehicle 2a alone as one vehicle group 5 (S11). With only one vehicle 2 detected from the image at S2, the processing proceeds to S11 after S7 without execution of S8 to S10.

After the identification of the vehicle group 5 through S10 or S11, the attribute detector 116 detects the color and the height of the vehicle 2a or each of the vehicles 2a to 2c of the identified vehicle group 5 as the attribute information (S12).

The transmitter transmits, to the information processing apparatus 8, for each vehicle group 5, the image, the imaging position, the imaging time, the vehicle group ID of the vehicle group 5, the vehicle IDs of the vehicles 2 of the vehicle group 5, the inter-vehicle distance between the probe vehicle 1 and one or two or more vehicles 2 of the vehicle group 5, the vehicle group length 37, the vehicle group width 38, the lateral distance 36 between the probe vehicle 1 and the vehicle group 5, the attribute information of the vehicles 2 of the vehicle group 5, the ID of the imaging device, and the probe-vehicle ID, in association with one another (S13). The transmitter 118 may transmit not the entire image showing the vehicle group 5 but a selected frame.

When the vehicle group 5 includes two or more vehicles 2, the transmitter 118 may further transmit the inter-vehicle distances between or among the vehicles 2 of the vehicle group 5 to the information processing apparatus 8. The transmitter 118 may further transmit the lateral distances among the vehicles 2 of the vehicle group 5 and information such as the number of the vehicles 2 of the vehicle group to the information processing apparatus 8.

Figure 8:
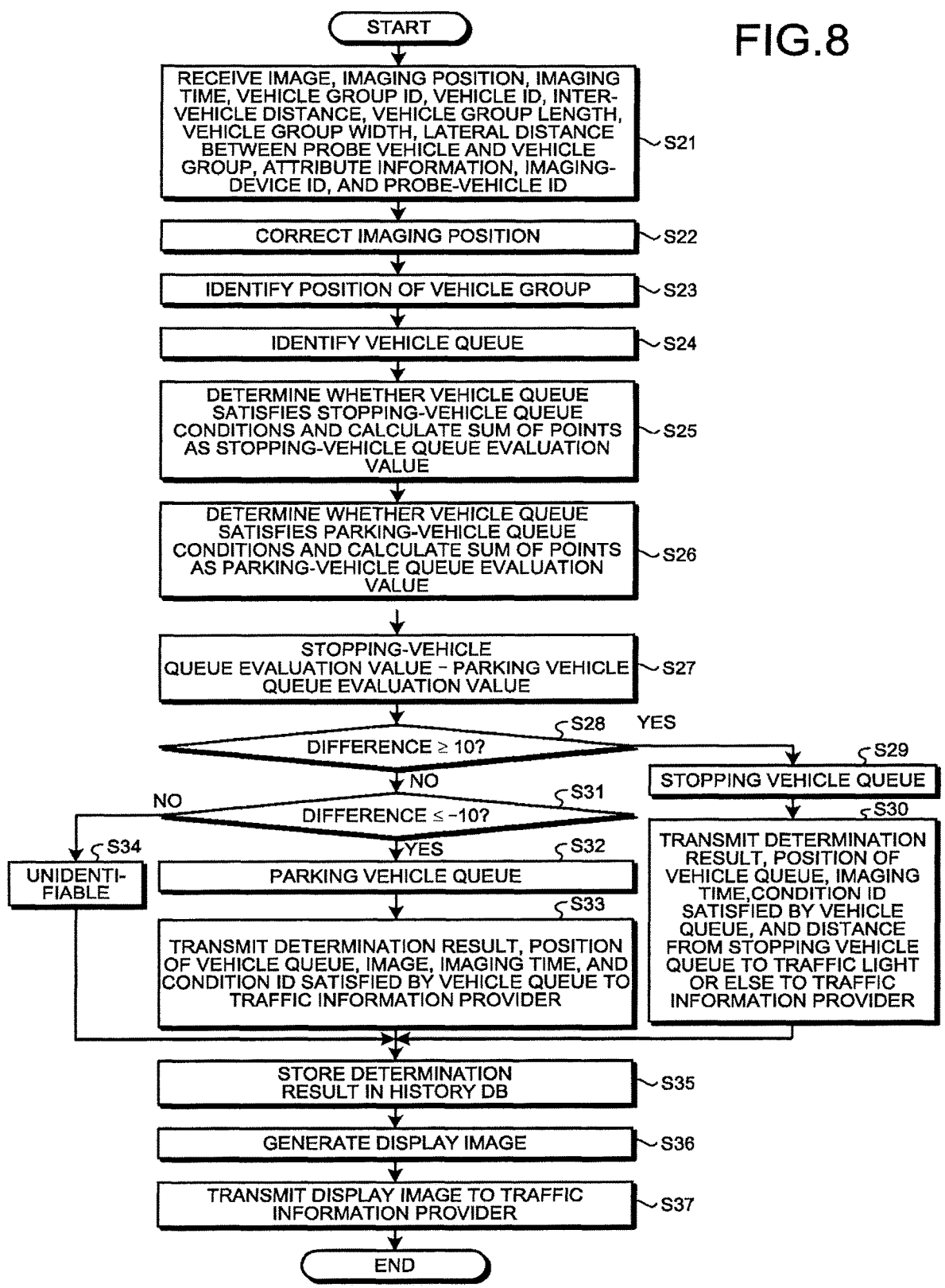
FIG. 8 is a flowchart of exemplary determination processing executed by the information processing apparatus according to the embodiment.

FIG. 8 is a flowchart of exemplary determination processing executed by the information processing apparatus 8 according to the embodiment.

The receiver 801 receives, from the controller 10 of the probe vehicle 1, the image, the imaging position, the imaging time, the vehicle group ID of the vehicle group 5, the vehicle IDs of the vehicle group 5, the inter-vehicle distance, the vehicle group length 37, the vehicle group width 38, the lateral distance 36 between the probe vehicle 1 and the vehicle group 5, the attribute information of the vehicles 2 of the vehicle group 5, the imaging-device ID, and the probe-vehicle ID (S21).

Next, the position corrector 802 corrects the imaging position received by the receiver 801 to a position on the lane of the road, referring to the lane database 851 and the digital map 852 (S22).

The position corrector 802 identifies the positions (latitudes and longitudes) of the forefront, the rear end, the longitudinal center of the vehicle group 5 according to the corrected imaging position, the inter-vehicle distance between the probe vehicle 1 and each of the vehicles 2a to 2c of the vehicle group 5, the vehicle group length 37, the vehicle group width 38, the lateral distance 36 between the probe vehicle 1 and the vehicle group 5 (S23).

Next, the vehicle-queue identifier 803 selects plurality of vehicle groups 5 identified by the controller 10 of the probe vehicle 1 and identifies the selected vehicle groups 5 as a vehicle queue (S24).

FIG. 9 is a diagram of a vehicle queue 50 identified by the information processing apparatus 8 according to the present embodiment by way of example. FIG. 9 shows vehicle groups 5a to 5d of vehicle queues 50a and 50b identified by the probe vehicle 1 in time-series.

The vehicle-queue identifier 803 identifies, as a vehicle queue 50, vehicle groups 5 of vehicles 2 that are located on the same lane in the inter-vehicle distance two times the length of the standard vehicle 2 or less on the basis of the imaging time, the corrected imaging position, the attribute information of the vehicles 2 of the vehicle group 5, and the vehicle IDs of the vehicles 2 of the vehicle group 5. The vehicle-queue identifier 803 selects one or more vehicle groups 5 having the corrected imaging positions in a certain distance or less from the vehicle groups 5 having a difference in the imaging time being a certain period or less, for example. Further, the vehicle-queue identifier 803 identifies the same vehicle 2 from different vehicle groups 5 in accordance with the vehicle ID and the attribute information (color and height), and identifies the vehicle groups 5 including the same vehicle 2 as a vehicle queue 50.

In the example of FIG. 9, the vehicle 2c at the head of the vehicle group 5a and the vehicle 2c at the end of the vehicle group 5b have the same ID "3". A vehicle 2e at the head of the vehicle group 5b and a vehicle 2e at the end of the vehicle group 5c have the same vehicle ID "5". The vehicle 2c of the vehicle group 5a and the vehicle 2c of the vehicle group 5b are the same in color and height. The vehicle 2e of the vehicle group 5b and the vehicle 2e of the vehicle group 5c are the same in color and height. In this case, the vehicle-queue identifier 803 determines that the vehicle 2c of the vehicle group 5a and the vehicle 2c of the vehicle group 5b are the same vehicle 2. The vehicle-queue identifier 803 determines that the vehicle 2e of the vehicle group 5b and the vehicle 2e of the vehicle Group 5c are the same vehicle 2.

That is, the vehicles 2 at the head and end of each vehicle group 5 are the same, so that the vehicle-queue identifier 903 determines that the vehicle groups 5a to 5c are consecutively located on the same lane. In this case, the vehicle-queue identifier 803 identifies the vehicle groups 5a to 5c as a vehicle queue 50a.

In the vehicle group 5c and the vehicle group 5d no vehicles 2 have the same vehicle ID. In the example of FIG. 9, the head of the vehicle group 5c and the end of the vehicle group 5d is apart in distance more than two times the length of the standard vehicle 2. In such a case, the vehicle-queue identifier 803 determines that the vehicle group 5d is a vehicle queue 50b different from the vehicle queue 50a.

In the above example, the vehicle-queue identifier 803 identifies the same vehicle 2 on the basis of both the vehicle IDs and the attribute information, however, the identification may be based on either of them. The vehicle-queue identifier 603 may identify the vehicle queue 50 in accordance with either the color or the vehicle height in the attribute information. The vehicle-queue identifier 803 may determine the vehicles 2 different in color or height as the same vehicle 2 as long as the vehicles 2 are sufficiently similar in a certain criterion or above. The vehicle-queue identifier 803 may determine a positional relationship among the vehicle groups 5a to 5d from the imaging time and the corrected imaging position without considering the vehicle IDs and the attribute information, to select consecutive vehicle groups 5. The vehicle-queue identifier 803 may select a plurality of vehicle groups 5 of the vehicles 2 in the inter-vehicle distance two times the length of the standard vehicle 2 or less, on the basis of the inter-vehicle distances between the vehicles 2 of the vehicle groups 5, to determine the selected vehicle groups 5 as a vehicle queue 50.

The vehicle groups 5a to 5d illustrated in FIG. 9 may be identified by controllers 10 of different probe vehicles 1. In this case, the vehicle-queue identifier 803 determines the vehicle groups 5 identified by the controllers 10 of the different probe vehicles 1 as one vehicle queue 50.

Upon determination of the vehicle groups 5a to 5d as stopping by the controller 10, the vehicle-queue identifier 803 determines that the identified vehicle queue 50 is stopping.

Referring back to the flowchart in FIG. 8, the stopping evaluator 804 determines whether the identified vehicle queue 50 satisfies the stopping vehicle-queue conditions to calculate the sum of points assigned to the satisfied stopping vehicle-queue conditions as the stopping vehicle-queue evaluation value (S25).

FIG. 10 is a diagram of exemplary conditions according to the embodiment. FIG. 10 illustrates classification of the stopping vehicle-queue conditions or the parking vehicle-queue conditions. Condition IDs are numbers for identifying the conditions. Each of the conditions is assigned with a point. The points represent values indicating level of importance of the conditions. The higher the level of the importance is, the larger the value assigned to is, for example. In the present embodiment, the storage 850 stores the details of the respective conditions and the values of the points assigned to the conditions in advance.

Specifically, the stopping vehicle-queue conditions include such conditions that the vehicle queue 50 is located near the center of a lane condition ID "1"), that the motion of the stopping vehicle queue 50 is detected, (condition ID "2"), that the distance from the forefront of the vehicle queue 50 to a traffic light or a railroad-crossing located ahead of the vehicle queue 50 is a threshold or less, (condition ID "3"), that the distance from the forefront of the vehicle queue 50 to a parking meter is longer than a threshold, (condition ID "4"), that the distance from the forefront of the vehicle queue 50 to a bus stop is a threshold or less (condition ID "5"), and that the proportion at which in previously detected vehicle queues, vehicle queues 50 having the same forefront or end position as a currently detected vehicle queue 50 were stopping vehicle queues is a threshold or more (condition ID "6").

The stopping evaluator 804 determines to which of the center of the lane and the road shoulder the vehicle queue 50 is closer, from the longitudinal centers of the respective vehicle groups 5 of the vehicle queue 50 and information on positions of lanes registered in the lane database 851. When determining that the vehicle queue 50 is closer to the center of the lane, the stopping evaluator 804 determines that the vehicle queue 50 satisfies the stopping vehicle-queue condition with the condition ID "1".

When the motion of the vehicle queue 50 is detected within a certain period or when the attribution information of the vehicles 2 of the vehicle queue 50 greatly changes within a certain period, the stopping evaluator 804 determines that the vehicle queue 50 has moved and chanced in order, and determines that the vehicle queue 50 satisfies the stopping vehicle-queue condition with the condition ID "2".

The stopping evaluator 804 calculates the distance from the forefront of the vehicle queue 50 to a traffic light, a railroad crossing, a parking meter, or a bus stop registered in the traffic-light position database 856, the railroad-crossing position database 857, the parkable-section database 855, or the stop-position database 854, to determine whether the vehicle queue 50 satisfies the stopping vehicle-queue condition with the condition ID "3", "4", or "5". The threshold of the condition ID "3" is set to 50 meters, the threshold of the condition ID "4" is set to 20 meters, and the threshold of the condition ID "5" is set to 30 meters, for example.

The stopping evaluator 604 calculates the proportion at which vehicle queues 50 having the same forefront or d position a currently detected vehicle queue 50 were the stopping vehicle queues, from results of previous determination stored in the history database 853, to determine whether the vehicle queue 50 satisfies the stopping vehicle-queue condition with the condition ID "6".

Next, the parking evaluator 805 determines whether the identified vehicle queue 50 satisfies the parking vehicle-queue conditions, and calculates the sum of points assigned to the satisfied parking vehicle-queue conditions as the parking vehicle-queue evaluation value (S26).

The parking vehicle-queue conditions include such conditions that the vehicle queue 50 is closer to a road shoulder than to the center of a lane, (condition ID "101"), that the distances from the forefront of the vehicle queue 50 to a traffic light and a railroad crossing are longer than a threshold, (condition ID "102"), that the distance from the forefront of the vehicle queue 50 to a parking meter is a threshold or less, (condition ID "103"), that the distance from the forefront of the vehicle queue 50 to a bus stop is longer than a threshold, (condition ID "104"), that the proportion at which in previously detected vehicle queues, vehicle queues 50 having the same forefront or end position as a currently detected vehicle queue 50 were the parking vehicle queues is a threshold or more, (condition ID "105"), and that the vehicle queue 50 having the same forefront or end position as a detected vehicle queue 50 and of which the vehicle 2 having similar attribution information are detected by another probe vehicle (condition ID "106").

When determining that the vehicle queue 50 is closer to the road shoulder than the center of the lane, the parking evaluator 905 determines that the vehicle queue 50 satisfies the parking vehicle-queue condition with the condition ID "101". The threshold of the condition ID "102" is set to 100, for example, larger than the threshold of the condition ID "3". The threshold of the condition ID "103" is set to 10 meters, for example, smaller than the threshold of the condition ID "4". The threshold of the condition ID "104" is set to 80 meters, for example, larger than the threshold of the condition ID "5". The stopping evaluator 834 and the parking evaluator 805 perform the determination using different thresholds for the stopping vehicle-queue conditions and the parking vehicle-queue conditions, preventing the addition of points to the vehicle queue 50 that does not include the characteristics of the stopping vehicle queue and the parking vehicle queue.

Next, the determiner 806 subtracts the parking vehicle-queue evaluation value from the stopping vehicle-queue evaluation value to find a difference (S27). The determiner 806 determines whether the difference between the stopping vehicle-queue evaluation value and the parking vehicle-queue evaluation value is 10 or more (S28).

With the difference being 10 or more (YES at S28), the determiner 806 determines the vehicle queue 50 as the stopping vehicle queue (S29). In this case, the transmitter 609 transmits a result of the determination, the imaging time, the forefront and end positions of the vehicle queue 50, the condition IDs of the conditions satisfied by the vehicle queue 50, and the distance from the stopping vehicle queue to a traffic light, for example, to the traffic information provider 9 (S30).

With the difference between the stopping vehicle-queue evaluation value and the parking vehicle-queue evaluation value being less than 10 (NO at S28), the determiner 806 determines whether the difference is −10 or less (S31). With the difference being −10 or less (YES at S31), the determiner 806 determines the vehicle queue 50 as the parking vehicle queue (S32). In this case, the transmitter 808 transmits a result of the determination, the image, the imaging time, the forefront and end positions of the vehicle queue 50, and the condition IDs of the conditions satisfied by the vehicle queue 50 to the traffic information provider 9 (S33). The transmitter 808 transmits different images and different imaging times associated with the vehicle groups 5 of the vehicle queue 50 at S30 and S33.

With the difference between the stopping vehicle-queue evaluation value and the parking vehicle-queue evaluation value being less than 10 and larger than −10 (NO at S28 and NO at S31), the determiner 806 determines the vehicle queue 50 as an unidentifiable vehicle queue 50 as the stopping vehicle queue or the parking vehicle queue (S34).

After any of the operations at S30, S33, and S34, the determiner 806 stores the result of determination in the history database 853 (S35). Specifically, the determiner 806 stores, in the history database 853, the result of determination, the condition IDs of the conditions satisfied by the vehicle queue 50, the forefront and end positions of the vehicle queue 50, the attribute information of the vehicles 2 of the vehicle groups 5 of the vehicle queue 50, the probe-vehicle ID of the probe vehicle 1 that has detected the vehicle groups 5 of the vehicle queue 50, the images and the imaging times associated with the vehicle groups 5 of the vehicle queue 50, and the inter-vehicle distances among the vehicles 2 of the vehicle groups 5 of the vehicle queue 50, in association with one another. The determiner 806 may further store the depth map and the corrected imaging position in the history database 853.

Next, the image generator 807 generates a display image that shows positions of the vehicle groups 5 of the identified vehicle queue 50 on a map (S36).

Figure 11:
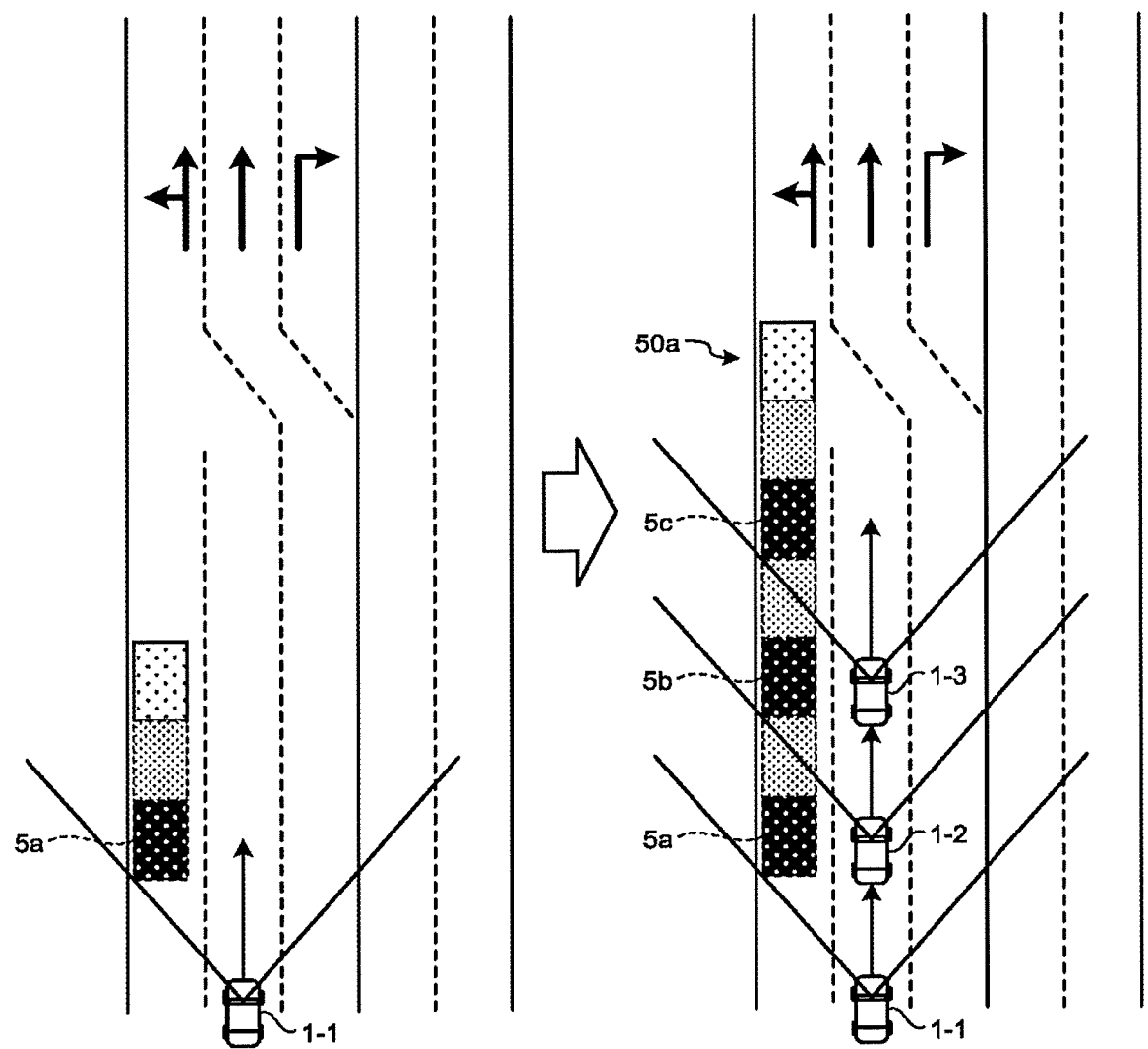
FIG. 11 is a diagram of an exemplary display image according to the embodiment.

FIG. 11 is a diagram of an exemplary display image according to the embodiment. As illustrated in FIG. 11, the image generator 807 displays the positions of the vehicle groups 5a to 5c on the map. Among each of the vehicle groups 5, vehicles closer to the probe vehicle 1 at the imaging time are more accurately detected. For this reason, the image generator 807 displays the vehicle groups 5 in different color densities by the length of the standard vehicle 2 such that the vehicle groups 5 closer to the probe vehicle at the imaging time 1 are displayed in darker color in a highlighted manner.

The image generator 307 displays an overlapping area of the positions of the vehicle groups 5 in a highlighted manner on the map. As illustrated in FIG. 11, the image generator 807 displays the overlapping areas of the vehicle groups 5 in darker color, for example. FIG. 11 shows positions (imaging positions) 1-1 to 1-3 of the probe vehicle when the vehicle groups 5a to 5c are imaged, respectively.

The image generator 807 may display the vehicle groups 5 not in different color densities by the vehicle length of the standard vehicle 2 but in color gradation. Alternatively, the image generator 807 may display the stopping vehicle queue and the parking vehicle queue in different display forms on the display image.

The transmitter 808 transmits the display image generated by the image generator 807 to the traffic information provider 9 (S37).

Conventionally, determination on whether the vehicle 2 has stopped for a certain period or longer or is temporarily stopping is made, upon every detection of a single stopping vehicle 2 on the road. This may, however, increase a processing load since the determination needs to be made a number of times equal to the number of stopping vehicles 2 on the road. In contrast, the information processing apparatus H of the present embodiment identifies two or more vehicle groups 5 as a vehicle queue 50 to determine whether the vehicle queue 50 is the stopping vehicle queue or the parking vehicle queue. Thereby, the information processing apparatus 8 of the present embodiment can determine the vehicle queue 50 including a plurality of stopping or parking vehicles 2 through a single operation, enabling reduction in processing load for the determination, in comparison with the individual determinations for the topping vehicles 2.

The information processing apparatus 8 of the present embodiment calculates the stopping vehicle-queue evaluation value and the parking vehicle-queue evaluation value for each vehicle queue 50 according to the stopping vehicle-queue conditions and the parking vehicle-queue conditions. Thereby, the information processing apparatus of the present embodiment can accurately identify the stopping vehicle queue or the parking vehicle queue on the road without the necessity to detect all the vehicles 2 of the vehicle queue 50.

The information processing apparatus 8 of the present embodiment identifies the same vehicle 2 from different vehicle groups 5 on the basis of the imaging time, the imaging position, and the attribute information of the vehicles 2 of the vehicle group 5, and identifies the vehicle groups 5 including the same vehicle 2 as a vehicle queue 50. Thereby, the information processing apparatus 8 of the present embodiment can identify consecutive vehicle groups 5 and accurately identify the vehicle queue 50.

In the present embodiment, the attribute information of the vehicles 2 includes the colors and the heights of the vehicles 2, and the information processing apparatus 8 of the present embodiment can identify the vehicles 2 with similar appearance on the basis of the attribute information.

The information processing apparatus 8 of the present embodiment further identifies the same vehicle 2 from different vehicle groups 5 in accordance with the vehicle ID, and identifies the vehicle groups 5 including the same vehicle 2 as a vehicle queue 53. Thereby, the information processing apparatus 8 of the present embodiment can accurately identify the same vehicle 2 and accurately identify the vehicle queue 50.

The information processing apparatus 8 of the present embodiment adds the stopping vehicle-queue evaluation value when the forefront or end position of the vehicle queue 50 satisfies any of the stopping vehicle-queue conditions, and adds the parking vehicle-queue evaluation value when the forefront or end position of the vehicle queue 50 satisfies any of the parking vehicle-queue conditions. Thereby, the information processing apparatus 8 of the present embodiment can determine whether the vehicle queue 50 as a whole is the stopping vehicle queue or the parking vehicle queue even when the stop positions of the individual vehicles 2 cannot be accurately detected due to erroneous detection, for example.

The information processing apparatus 8 of the present embodiment can generate the display image that shows the overlapping area of the positions of the vehicle groups 5 in a highlighted manner on the map, and can thus show the positions where vehicles 2 are likely to be at a stop, on the display image.

Upon determining that the vehicle 2a detected from the image is stopping, the controller 10 of the present embodiment identifies the vehicle 2a and the vehicles 2b and located on the same lane on the image as the vehicle group 5. Thereby, the controller 10 of the present embodiment can reduce a processing load and a length of processing time for determining whether the vehicle group 5 appearing in the image is stopping. Owing to the reduction in processing time, the controller 10 of the present embodiment can shorten a detection cycle and thus reduce the occurrence of erroneous detection due to the change in the positions of the vehicles in the group during the detection operation.

The controller 10 of the present embodiment detects the colors and the heights of the vehicles 2a to 2c of the vehicle groups 5 as the attribute information. The information processing apparatus 8 can thus select the vehicle groups 5 including the same vehicle 2 in accordance with the colors and the heights to accurately identify the vehicle queue 50.

The controller 10 of the present embodiment sets the vehicle ID that enables identification of the detected vehicle 2. Owing to such features of the controller 10, the information processing apparatus 8 of the present embodiment can accurately select the vehicle groups 5 including the same vehicle 2 and identify the vehicle queue 50.

The present embodiment has described the thresholds, the contents of the data stored in the respective databases by wave of example only, and they are not limited to such examples.

First Modification

In the first embodiment the image generator 807 of the information processing apparatus 8 displays the vehicle groups 5 identified by one probe vehicle 1. The image generator 807 may further display, in a superimposed manner, vehicle groups 5 identified by the probe vehicle 1 traveling on the opposite lane.

Figure 12:
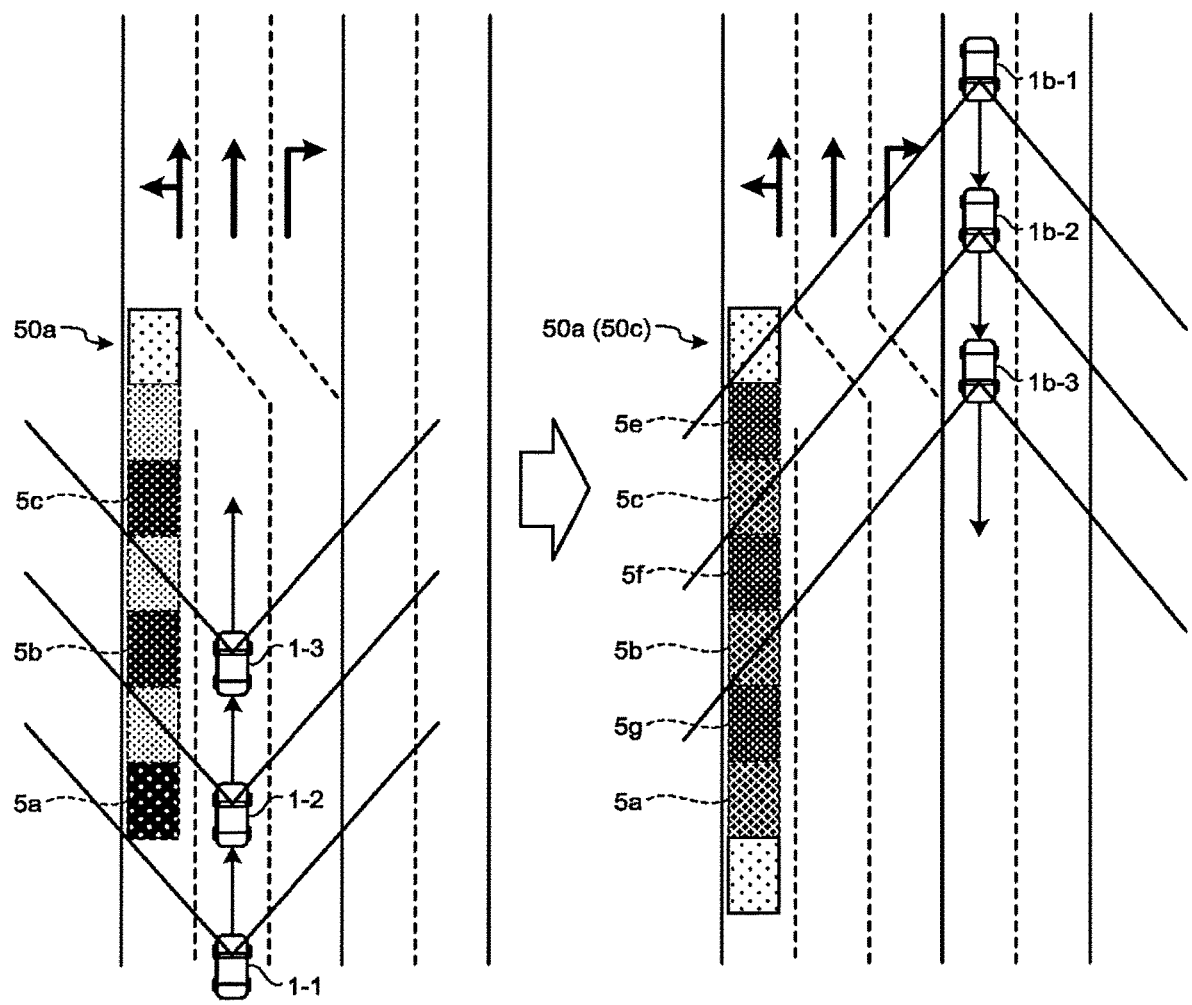
FIG. 12 is a diagram of an exemplary display image according to a first modification.

FIG. 12 is a diagram of an exemplary display image according to a first modification. The image generator 807 generates a display image that shows a vehicle queue 50c, including vehicle groups 5d to 5g identified by a probe vehicle 1b traveling on the opposite lane as the probe vehicle 1 travels, superimposed on a vehicle queue 50a including the vehicle groups 5a to 5c identified by the probe vehicle 1. FIG. 12 shows the positions 1b-1 to 1b-3 of the probe vehicle 1b at the time when the vehicle groups 5d to 5g are imaged, respectively by superimposition of the vehicle groups 5 identified by the probe vehicle 1b traveling on the opposite lane on the display image, the image generator 807 can accurately display the position of the stopping vehicle queue 50 on the lane.

Second Modification

The image generator 807 may display the vehicle groups 5 identified from an image generated by a front camera of the probe vehicle 1 and the vehicle groups 5 identified from an image generated by a rear camera in a superimposed manner.

Figure 13:
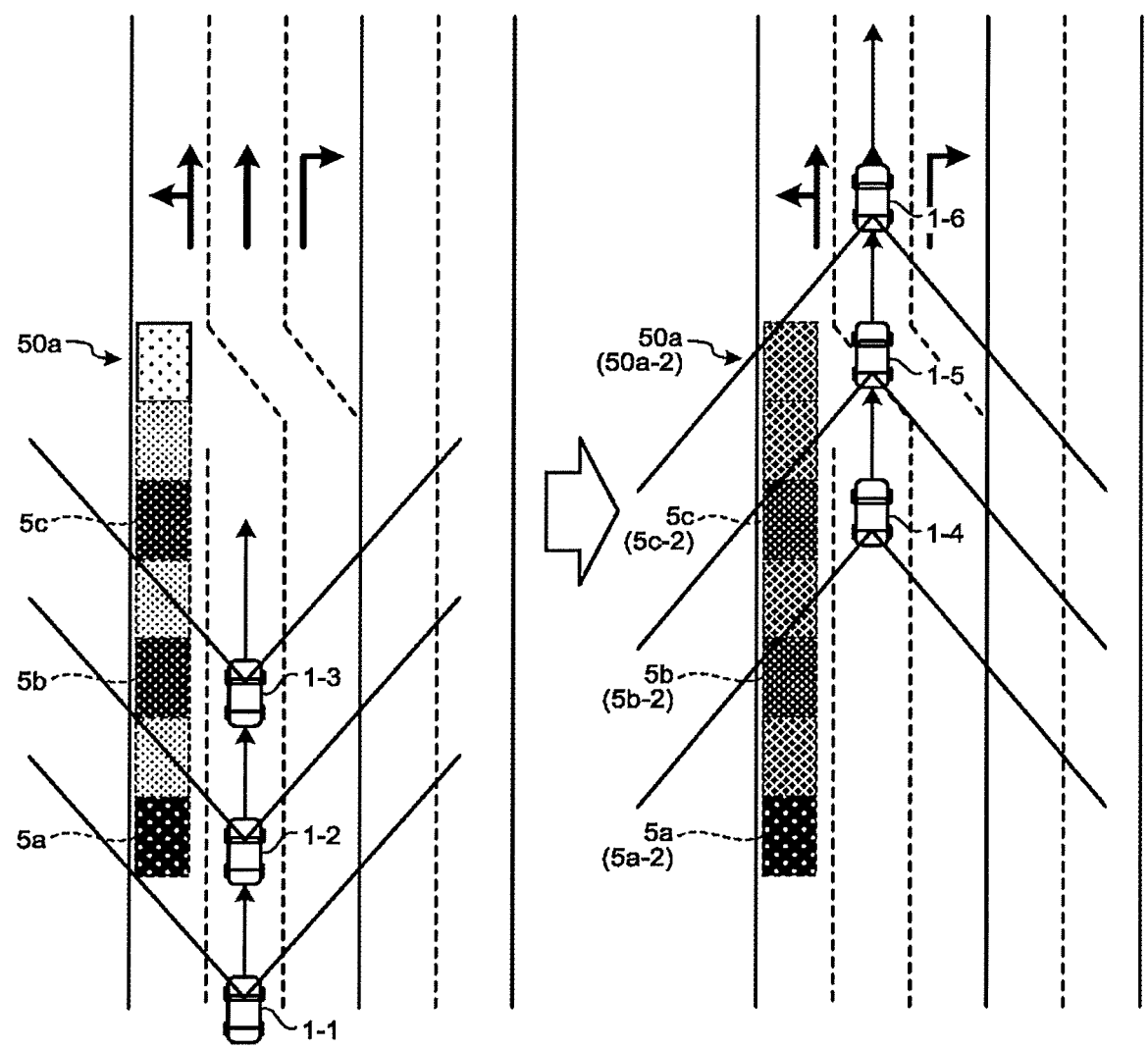
FIG. 13 is a diagram of an exemplary display image according to a second modification.

FIG. 13 is a diagram of an exemplary display image according to a second modification. The probe vehicle 1 of the present modification includes another imaging device (rear camera) that images the area behind the probe vehicle 1 in addition, to the imaging devices 11 (front cameras) that image the area ahead of the probe vehicle 1. The rear camera and the front cameras have different imaging-device IDs. The image generator 807 generates a display image that shows a vehicle queue 50a-2, including vehicle groups 5a-2 to 5c-2 identified from the image generated by the rear camera of the probe vehicle 1, superimposed on the vehicle queue 50a including the vehicle groups 5a to 5c identified from the image generated by the front cameras of the probe vehicle FIG. 13 shows the positions 1-4 to 1-6 of the probe vehicle 1b at the time when the vehicle groups 5a-2 to 5c-2 are imaged, respectively.

The information processing apparatus 8 of the present modification can accurately display the position of the vehicle queue 50 identified from the image generated by the single probe vehicle 1.

According to the present modification, the vehicle-queue identifier 803 may also identify, as the vehicle queues 50, thio vehicle groups 5 identified from the image by the front cameras and the vehicle groups 5 identified from the image by the rear camera. The probe vehicle 1 may additionally include imaging devices that image the lateral sides of the probe vehicle 1. The image generator 807 may further superimpose the vehicle groups 5 appearing in an image of the lateral side on the display image.

Third Modification

The probe vehicle 1 may be a tram vehicle, a motorcycle, an autonomous vehicle traveling on the road. The vehicles 2 as a subject of the determination may also be tram vehicles.

Fourth Modification

The stopping evaluator 804 and the parking evaluator 805 may determine whether each vehicle group 5 satisfies the conditions, to calculate the stopping vehicle-queue evaluation value and the parking vehicle-queue evaluation value. The determiner 806 may determine whether each vehicle group stopping or parking.

Fifth Modification

The information processing apparatus 8 may include any or all of the vehicle detector 111, the measurer 112, the vehicle-speed calculator 113, the travel determiner 114, the vehicle-group identifier 115, the attribute detector 116, and the ID determiner 117 of the controller 10 of the embodiment. According to such configuration, the transmitter 118 of the controller 10 transmits the image, the imaging position, and the imaging time to the information processing apparatus 8, for example.

Sixth Modification

When the vehicle queue 50 determined as the parking vehicle queue by the determiner 806 satisfies the condition with the condition ID "3" or "5", the vehicle queue 50 may be parked in a no-parking cone such as in the vicinity of a traffic light, a railroad crossing, or a bus stop. In this case, the transmitter 808 may transmit information representing high possibility of the vehicle queue 50 being parked in a no-parking zone to the traffic information provider 9.

Other Modifications

The conditions illustrated in FIG. 10 are merely exemplary. The stopping vehicle-queue conditions and the parking vehicle-queue conditions may further include a condition based on the temperature of a muffler of the vehicle 2 detected with an infrared camera, for example. The thresholds used in the respective conditions may vary depending on time, the day of the week (including weekdays, Saturday, Sunday, and national holidays), or the time of sunrise or sunset in each month, for example. The conditions and the points may be changed after the start of operation of the information processing system S. The information processing apparatus 8 may download the conditions from an external device.

The position corrector 802 may correct the imaging position according to a positional history of the probe vehicle 1 acquired at intervals of a few seconds. The controller 10 may correct the imaging position on the basis of information acquired from the car navigation system of the probe vehicle 1. The position corrector 802 may detect lanes from an image by a known image processing method.

The various kinds of databases may be stored in a cloud environment in place of the storage 850. The digital map 852, the parkable-section database 855, the traffic-light position database 856 may be updated to new information at regular time intervals.

The information processing apparatus 8 may calculate the ratio between the stopping vehicle queues and the parking vehicle queues in the past history in advance. Upon each storage of a result of determination in the history database 853, the determiner 806 may calculate the ratio between the stopping vehicle queues and the parking vehicle queues for storage, for example. The determiner 806 may calculate, as background processing, the ratio therebetween in a time slot with a low processing load. The ratio therebetween may be calculated in an external cloud environment.

Computer programs executed by the controller 10 or the information processing apparatus 8 of the embodiment are recorded in installable or executable file format on a computer-readable recording medium such as a compact disc read only memory (CD-ROM), a flexible disk (FD), a compact disc recordable (CD-R), and a digital versatile disc (DVD). The computer programs executed by the controller 10 or the information processing apparatus 8 of the embodiment may be stored in a computer connected to a network such as the Internet and downloaded via the network. The computer programs executed by the controller 10 or the information processing apparatus 8 of the embodiment may be provided or distributed via a network such as the Internet. The computer programs executed by the controller 10 or the information processing apparatus 8 of the embodiment may be embedded in a ROM, for example.

The computer programs executed by the controller 10 of the embodiment include a module configuration including the above elements (acquirer, vehicle detector, measurer, vehicle-speed calculator, travel determiner, vehicle-group identifier, attribute detector, ID determiner, and transmitter). As actual hardware, a CPU (processor) reads and executes the computer programs from the ROM, to load the elements on a main storage device to generate the acquirer, the vehicle detector, the measurer, the vehicle-speed calculator, the travel determiner, the vehicle-group identifier, the attribute detector, the ID determiner, and the transmitter the main storage device.

The computer programs executed by the information processing apparatus 8 of the embodiment include a module configuration including the above elements (receiver, position corrector, vehicle-queue identifier, stopping evaluator, parking evaluator, image generator, and transmitter). As actual hardware, a CPU reads and executes the computer programs from the storage medium to load the elements on a main storage device to generate the receiver, the position corrector, the vehicle-queue identifier, the stopping evaluator, the parking evaluator, the image generator, and the transmitter on the main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
one or more processors configured to:
receive from an onboard device of a probe vehicle, an image, imaging time, and a position of the probe vehicle at the imaging time, the image showing a vehicle group including one or more vehicles at a stop on the same lane, the imaging time at which the image is generated;
select a plurality of vehicle groups in accordance with the imaging time and the position of the probe vehicle at the imaging time;
identify the selected vehicle groups as a vehicle queue;
calculate a stopping vehicle-queue evaluation value on the basis of a plurality of stopping vehicle-queue conditions, the stopping vehicle-queue evaluation value that indicates a level of possibility of the identified vehicle queue being a stopping vehicle queue that has stopped for a period less than a threshold, the stopping vehicle-queue conditions that define characteristics of the stopping vehicle queue;
calculate a parking vehicle-queue evaluation value on the basis of a plurality of parking vehicle-queue conditions, the parking vehicle-queue evaluation value that indicates a level of possibility of the identified vehicle queue being a parking vehicle queue that has stopped for a period not less than the threshold, the parking vehicle-queue conditions that define characteristics of the parking vehicle queue; and
determine whether the identified vehicle queue is the stopping vehicle queue or the parking vehicle queue, according to the stopping vehicle-queue evaluation value and the parking vehicle-queue evaluation value.

2. The information processing apparatus according to claim 1, wherein
the one or more processors
receive attribute information of the vehicles of the vehicle groups,
identify the same vehicle from the vehicle groups on the basis of the attribute information of the vehicles of the vehicle groups, and
identify the vehicle groups including the same vehicle as a vehicle queue.

3. The information processing apparatus according to claim 2, wherein
the attribution information includes colors and heights of the vehicles.

4. The information processing apparatus according to claim 1, wherein
the one or more processors
receive identification information of each of the vehicles of the vehicle groups, and
identify the same vehicle from the vehicle groups on the basis of the identification information, and identifies the vehicle groups including the same vehicle as a vehicle queue.

5. The information processing apparatus according to claim 1, wherein
the stopping vehicle-queue conditions and the parking vehicle-queue conditions each include a condition that concerns a forefront position or an end position of the vehicle queue, and
the one or more processors
add the stopping vehicle-queue evaluation value when the forefront position or the end position of the vehicle queue satisfies one of the stopping vehicle-queue conditions, and
add the parking vehicle-queue evaluation value when the forefront position or the end position of the vehicle queue satisfies one of the parking vehicle-queue conditions.

6. The information processing apparatus according to claim 1, wherein
the one or more processors
generate a display image that shows an overlapping area of positions of the vehicle groups on a map in a highlighted manner.

7. An information processing system that comprises an onboard device of a probe vehicle and an information processing apparatus connected to the onboard device via a network, the information processing system comprising:
one or more processors configured to:
detect a vehicle from an image generated by an imaging device mounted on a probe vehicle;
determine whether the detected vehicle is at a stop;
when a travel determiner determines that the vehicle is at a stop, identify as a vehicle group, the vehicle and one or a plurality of other vehicles located on the same lane from the image;
select a plurality of vehicle groups in accordance with the imaging time and the position of the probe vehicle at the imaging time;
identify the selected vehicle groups as a vehicle queue;
calculate a stopping vehicle-queue evaluation value on the basis of a plurality of stopping vehicle-queue conditions, the stopping vehicle-queue evaluation value that indicates a level of possibility of the identified vehicle queue being a stopping vehicle queue that has stopped for a period less than a threshold, the stopping vehicle-queue conditions that define characteristics of the stopping vehicle queue;
calculate a parking vehicle-queue evaluation value on the basis of a plurality of parking vehicle-queue conditions, the parking vehicle-queue evaluation value that indicates a level of possibility of the identified vehicle queue being a parking vehicle queue that has stopped for a period not less than the threshold, the parking vehicle-queue conditions that define characteristics of the parking vehicle queue; and determine whether the identified vehicle queue is the stopping vehicle queue or the parking vehicle queue, according to the stopping vehicle-queue evaluation value and the parking vehicle-queue evaluation value.

8. An information processing method, comprising: detecting a vehicle from an image generated by an imaging device mounted on a probe vehicle;

determining whether the detected vehicle is at a stop;

when determining that the vehicle is at a stop, identifying, as a vehicle group, the vehicle and one or a plurality of other vehicles located on the same lane on the image;

selecting a plurality of vehicle groups in accordance with imaging time at which the image is generated and the position of the probe vehicle at the imaging time, and identifying the selected vehicle groups as a vehicle queue;

calculating a stopping vehicle-queue evaluation value on the basis of a plurality of stopping vehicle-queue conditions, the stopping vehicle-queue evaluation value that indicates a level of possibility of the identified vehicle queue being a stopping vehicle queue that has stopped for a period less than a threshold, the stopping vehicle-queue conditions that define characteristics of the stopping vehicle queue;

calculating a parking vehicle-queue evaluation value on the basis of a plurality of parking vehicle-queue conditions, the parking vehicle-queue evaluation value that indicates a level of possibility of the identified vehicle queue being a parking vehicle queue that has stopped for a period not less than the threshold, the parking vehicle-queue conditions that define characteristics of the parking vehicle queue;

determining whether the identified vehicle queue is the stopping vehicle queue or the parking vehicle queue, according to the stopping vehicle-queue evaluation value and the parking vehicle-queue evaluation value; and transmitting a result of the determining to a traffic information provider.

* * * * *